Nov. 29, 1966    A. FIELD    3,287,863
BELT HOLDER ASSEMBLY
Filed June 23, 1964
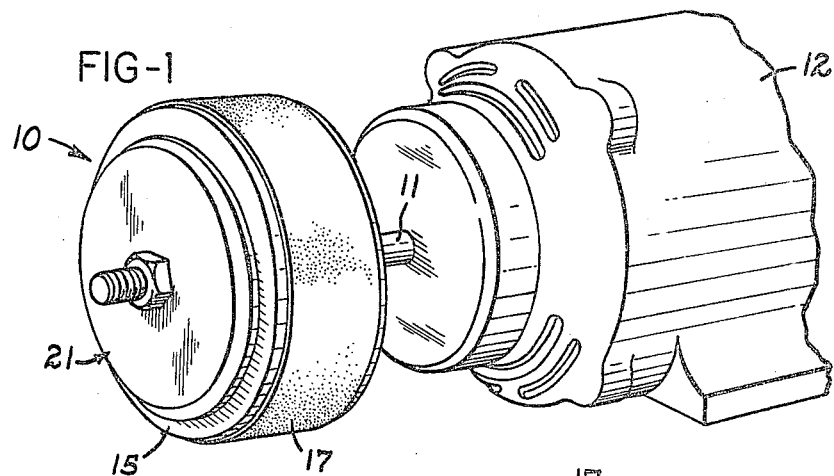
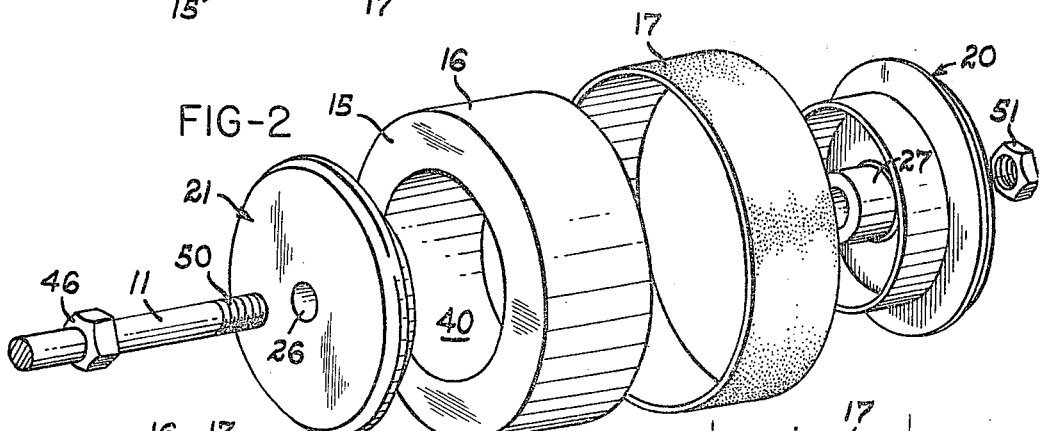
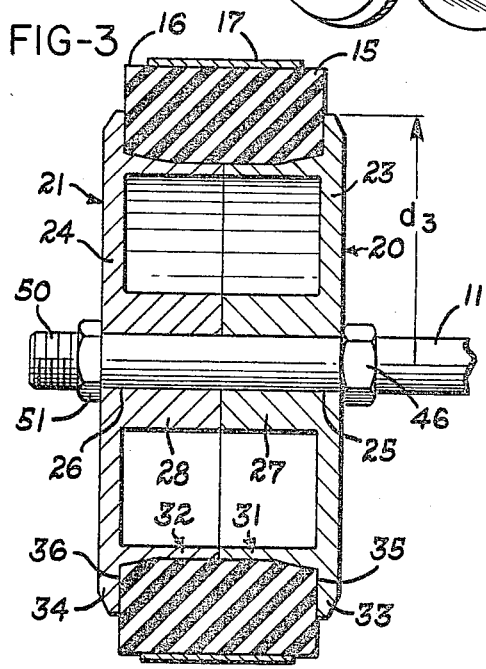
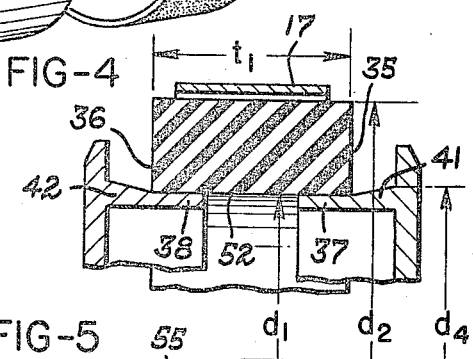
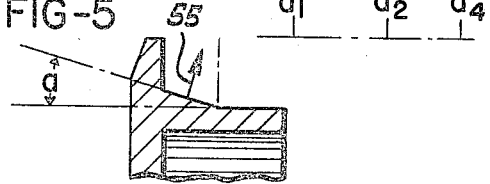
INVENTOR.
ALBERT FIELD
BY
Marechal, Biebel, French & Bugg
ATTORNEYS

United States Patent Office 3,287,863
Patented Nov. 29, 1966

3,287,863
BELT HOLDER ASSEMBLY
Albert Field, 1706 Salem Ave., Dayton, Ohio
Filed June 23, 1964, Ser. No. 377,249
3 Claims. (Cl. 51—375)

This invention relates to the art of grinding, buffing, abrading, sanding and the like, and particularly to apparatus for securing a cloth belt to a rotating drum.

Substantial use is made of cloth belts having an outer surface suitably prepared for grinding, abrading, polishing, buffing, or sanding operations by mounting the belts on cylindrical supports capable of being rotated at high speeds. The belts are inexpensive and disposable so that when they are worn they are replaced by another belt, and this requires that the cylindrical support be radially expandable to permit the belt to be easily placed thereon and then secured thereto. However, to effect expansion of these cylindrical supports many of the prior art devices axially squeeze a resilient member between two disks so that a bow is created in the outer surface of the support and an uneven force is exerted on the belt causing uneven wear and possibly tears in the edge of the belt. Moreover, many of the belt supports known today have a complex construction requiring a substantial period of time to install and replace a belt, as well as being expensive in cost.

An important object of this invention is to provide apparatus for holding an abrasive belt or the like having a cylindrical support surface in such a manner that a uniform radial force is applied to the entire inner surface of the belt so that it wears evenly and results in improved quality of the work being performed thereby.

Another object of the invention is to provide a resilient backing member for an abrasive belt or the like which exerts a uniform pressure on the belt and which permits comparatively fast and simplified installation and removal, and further to provide apparatus of the aforesaid type wherein only a simple manual loosening of a nut is required to secure and release the abrasive belt from the backing member.

A further object of this invention is to provide apparatus for holding an abrasive belt or the like which uses a minimum number of parts for increased simplicity and lower cost, and particularly to provide a pair of retainer members which apply both axial and radial forces to a resilient belt supporting member for uniform radial expansion of the outer surface of the resilient member.

Additional objects and advantages of the invention will be apparent from the following description, the accompanying drawings and the appended claims.

In the drawings—

FIG. 1 is a perspective view of the belt holder assembly in accordance with the invention;

FIG. 2 is an exploded perspective view of the belt holder assembly of the invention;

FIG. 3 is a cross-sectional view of the invention taken through the center of the belt holder assembly;

FIG. 4 is an enlarged fragmentary cross-sectional view of a portion of the belt holder assembly in an unstressed position; and FIG. 5 is an enlarged sectional view of one of the support ring retainers.

Referring to the drawings wherein a preferred embodiment of the invention is shown, FIG. 1 illustrates the belt holder assembly 10 mounted for high speed rotation on the drive shaft 11 of the electric motor 12, or a portable air or electrical tool. The assembly 10 includes an annular belt support 15 of a resilient material having an outer surface 16 on which the cloth belt 17 of the type suitable for accomplishing the desired abrading, sanding, polishing, buffing operation. In accordance with the invention, the pair of disk shaped retainers 20 and 21 apply both axial and radial forces to the annular belt support 15 so that the outer surface 16 presents a true cylinder in its expanded position.

Specifically, the annular support 15 is constructed of rubber or other resilient material capable of being conformed under pressure and of quickly returning to its initial shape when the conforming pressures are removed. In its normal unstressed condition, the support has uniform inner and outer diameters $d_1$ and $d_2$ with a width $t_1$. The retainers 20 and 21 are substantially identical in configuration and include side walls 23 and 24 which are substantially flat on the outer surfce thereof. The apertures 25 and 26 are formed centrally in the side walls 23 and 24 and extend through the axial bosses 27 and 28 which project inwardly of the assembly 10 from an integral connection with the side walls 23 and 24.

The annular support flanges 31 and 32 are spaced radially outward from the bosses 27 and 28 and also extend axially inward of the assembly 10 from integral connections with the side walls 23 and 24. The outer periphery of the side walls 23 and 24 has the annular side flanges 33 and 34 thereon extending circumferentially around the support flanges 31 and 32 for engaging the side walls 35 and 36 of the annular support 15. The side flanges 33 and 34 have an outer diameter $d_3$ which preferably extends about one-half the distance between the inner and outer diameters $d_1$ and $d_2$ of the support 16.

The support flanges 31 and 32 have innermost sections 37 and 38 which have a uniform outer diameter substantially equal to or slightly less than the unstressed inner diameter $d_1$ of the annular support 15 so that the sections 37 and 38 may be readily inserted into the interior opening 40 of the support 15. The annular tapered portions 41 and 42 of the flanges 31 and 32 extend around the associated flange and gradually slope outwardly at an angle $a$ from the sections 37 and 38 to a larger diameter $d_4$ at the juncture with the side walls 23 and 24. The tapered portions 41 and 42 and the angle $a$ are important features of the invention, and their specific function and cooperation with other portions of the structure will be described in connection with the operation thereof.

The two retainers 20 and 21 are secured to the annular belt support 15 by the shaft 11 which has an enlarged shoulder 46 formed integrally thereon a predetermined distance from the end 50 of the shaft 11. The shaft thus extends through the apertures 25 and 26 in the bosses 27 and 28, and the end 50 is threaded for receiving the nut 51 so that the retainers 20 and 21 can be drawn together to the extent that the bosses 27 and 28 come into contact, as seen in FIG. 3. In this assembled position, the support flanges 31 and 32 are also in contact so that they also limit the extent to which the retainers 20 and 21 may be drawn together. While the shaft 11 is indicated as being a drive shaft of the motor 12 it is within the scope of the invention to use a separate shaft for securing the retainers 20 and 21 together, and such a shaft would necessarily be adapted to be secured in a chuck of a drive mechanism.

To assemble the invention, the cloth belt 17 is placed on the outer surface 16 of the annular belt support 15, and this is easily accomplished since the belt 17 has an inner diameter somewhat greater than the unstressed outer diameter $d_2$ of belt support 15. The innermost sections 37 and 38 of the flanges 31 and 32 are then placed in the annular support 15 adjacent the inner surface 52 thereof, and the shaft 11 is then inserted through the apertures 25 and 26 so that one of the retainers 23 is in engagement with the enlarged shoulder 46 formed integrally on the shaft 11. The nut 51 is then placed on the similarly threaded end 50 of the shaft 11, and suitable wrenches are used on the wrench surfaces of the shoulder 46 and nut 51 to draw the retainers 20 and 21 together into the opening 40 of the resilient belt support 15.

This action causes each of the tapered sections 41 and 42 to apply an axially inward and radially outward force to the inner surface 52 of the annular support 15 in the general direction of the force vector 55, shown in FIG. 5. The retainers 20 and 21 are drawn completely together until the bosses 27 and 28 meet, at which point the side flanges 33 and 34 snugly engage the sides 35 and 36 of the support 15 without applying any substantial amount of axial pressure thereto which would tend to bow the outer surface 16 outwardly.

The net effect of the forces 55 created by the tapered sections 41 and 42 and their cooperation with the resilient belt support 15 is to expand the outer surface 16 outwardly in a uniform manner to a diameter which is slightly greater than the inner diameter of the belt 17 so that the belt is locked securely on the support 15. This uniform expansion results from the forces applied to the inner surface 52 by the tapered sections 41 and 42 being evenly distributed within the resilient material of the support 15 so that there is even expansion of the outer surface 16. The axial components of the forces 55 created by the tapered sections 41 and 42 cooperate in the support 15 and form an important factor in the outward expansion of the center of the support 15 between the sides 35 and 36 thereof so that there is no bowing of the outer surface 16.

When the belt 17 becomes worn, or when it is desired to replace it for any reason, the nut is loosened and the retainers 20 and 21 separated so that the tapered sections 41 and 42 are withdrawn from contact with the inner surface 52 of the belt support 15. The resilience of the support 15 immediately returns the support to its initial configuration wherein the outer diameter $d_1$ is somewhat less than the inner diameter of the belt 17 so that the latter can be easily removed and replaced. To secure the replacement belt in place, it is merely necessary to again tighten the nut 51 to draw the retainers 20 and 21 together and expand the belt support 15 as described above.

The precise angle $a$ and values of $t_1$ and $t_2$, $d_1$, $d_2$ and $d_3$ are dictated by the size of the belt support assembly 10 as well as the resilience of the support 15. Suffice to say, that these dimensions must be correlated in order to achieve the functional results described above. In addition, it may be desirable in certain instances to taper the entire outer surfaces of the support flanges 31 and 32 or to have the tapered sections 41 and 42 slightly rounded in order to achieve uniform expansion of the surface 16.

It is within the scope of the invention to use other and different expedients to secure the retainers 20 and 21 together. For example, a nut 51 could be replaced by a nut which can be operated by the same spanner wrench that is used with a portable power tool used to drive the belt holder. In addition, the nut could be replaced by a rigid head on the end of the shaft 11, and the shoulder 46 could be replaced by a nut which threadedly engages the adjacent portion of the shaft 11.

The invention has thus provided an improved and simplified belt support assembly which applies uniform pressure over the entire inner surface of the belt for even wear, longer belt life, and higher quality work. A belt can be easily secured and replaced thereon in a minimum of time, and the annular support has a radial thickness substantially less than many prior art devices for lighter weight and less cost, as well as a decreased requirement for power to rotate the assembly.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed:

1. A belt holder assembly for holding a cloth belt having a predetermined inner diameter in place comprising, a resilient annular support having side surfaces extending between parallel inner and outer surfaces thereof, said outer surface of said annular support in its unstressed condition having a diameter slightly less than the predetermined diameter so that the belt can be easily slipped thereon, a pair of disk shaped retainers for insertion into said annular support from opposite sides thereof and each including inner side walls to engage at least a portion of each of said side surfaces of said annular support, inwardly extending annular flanges on each of said side walls for engaging said inner surface of said annular support, each said flange including a tapered outer portion adjacent said side walls of said annular support and a cylindrical inner portion on the innermost end of said tapered portion, said tapered portion having a smaller outer diameter at the innermost end thereof substantially equal to the unstressed inner diameter of said annular support and a larger outer diameter adjacent said side walls, screw means extending through each of said retainers for drawing said retainers together within said annular support until said inner portions meet that that said tapered portions impart a force which extends axially inward and radially outward of said tapered portion to cooperate with said resilient annular support to effect radial expansion of said outer surface to a diameter slightly greater than the predetermined diameter of the belt for holding the same securely on said outer surface, and said cylindrical inner portions limit the inner area of said annular support to which said force is applied to prevent the outer diameter of said outer surface of said annular support from being greater at its outer edge.

2. A belt holder assembly as defined in claim 1 wherein said tapered portion has a gradual slope which terminates adjacent said side walls.

3. A belt holder assembly as defined in claim 1 wherein said side walls are adjacent said side surfaces and resist outward axial expansion of the adjacent portion of said annular support.

References Cited by the Examiner

UNITED STATES PATENTS 2,810,994  10/1957  Schmidt _____ 51—375

FOREIGN PATENTS 1,336,833  7/1963  France.

ROBERT C. RIORDON, *Primary Examiner.*

L. S. SELMAN, *Assistant Examiner.*